United States Patent [19]

Lambertz

[11] 4,177,545
[45] Dec. 11, 1979

[54] FASTENING METHOD AND PRODUCT

[75] Inventor: Martin R. Lambertz, New Hamburg, Canada

[73] Assignee: The Stanley Works, Limited, Ontario, Canada

[21] Appl. No.: 755,057

[22] Filed: Dec. 28, 1976

[30] Foreign Application Priority Data

Dec. 30, 1975 [CA] Canada ................................ 242770

[51] Int. Cl.² ...................... B21D 53/40; B21K 13/02; B23P 11/00; B21D 39/03
[52] U.S. Cl. ........................................ 29/11; 29/509; 29/522 A; 85/37
[58] Field of Search ...................... 29/11, 3, 509, 522; 227/57, 60, 53, 61, 62; 85/37, 39, 70

[56] References Cited

U.S. PATENT DOCUMENTS

| | | | |
|---|---|---|---|
| 1,602,422 | 10/1926 | Way et al. | 29/11 |
| 1,705,507 | 3/1929 | Soss | 29/11 |
| 1,874,415 | 8/1932 | Atwood | 29/11 |
| 2,179,900 | 11/1939 | Sheane | 227/61 |
| 2,385,169 | 9/1945 | Stone | 29/11 X |
| 3,358,550 | 12/1967 | Crowther et al. | 85/70 |
| 3,505,923 | 4/1970 | Neill | 85/37 |
| 3,526,032 | 9/1970 | Pipher | 29/509 |
| 3,995,406 | 12/1976 | Rosman | 29/522 X |
| 4,007,540 | 2/1977 | Tyree | 29/509 |

Primary Examiner—Horace M. Culver
Attorney, Agent, or Firm—Neil F. Markva

[57] ABSTRACT

A method and product in which a stud or rivet-like element is secured in a base or two elements are hingedly connected by means of a pin, in which the stud or pin is prevented from rotating relative to at least one element. The at least one element is provided with a non-circular hole into which the pin is inserted and then upset so as to assume the non-circular shape. The stud or pin is of the semi-tubular type having a bore of critical length, relative to the thickness of the at least one element, so as to confine upsetting substantially to the depth of the non-circular hole.

6 Claims, 8 Drawing Figures

U.S. Patent    Dec. 11, 1979    4,177,545
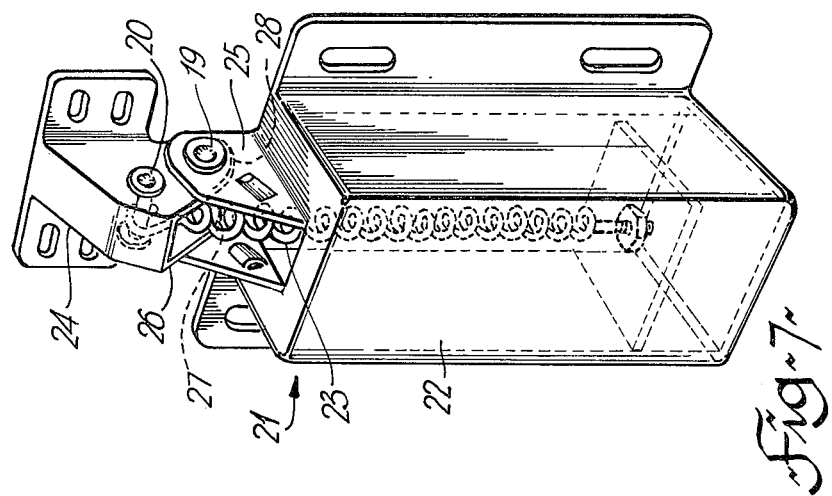
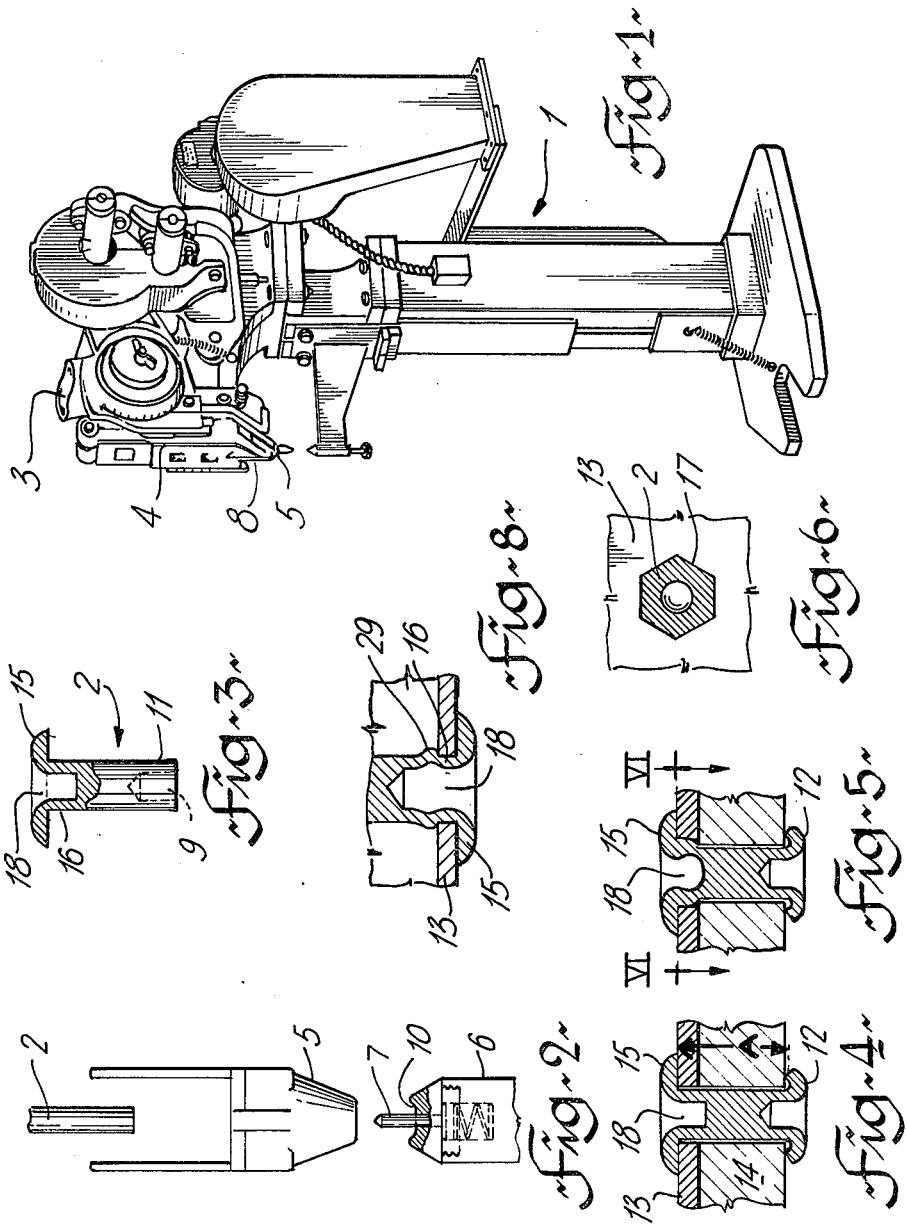

FASTENING METHOD AND PRODUCT

This invention relates to a method of fastening at least two elements to each other while preventing rotation of at least one element relative to the other, and to the product of the method. More particularly, this invention relates to the hinging of two elements wherein a pivotal element is secured against axial movement relative to one of the hinge elements.

Hinges for major domestic applicances such as chest freezers are, of course, well-known and generally of the spring-loaded type which counterbalance the weight of the lid as it is raised. Many variations of such spring-loaded hinges are known but all suffer from the disadvantage that they squeak in operation despite many attempts, such as lubrication, elimination of moving parts and coating of both hinge and the spring elements, to overcome it.

One of the few remaining squeak generation areas lies in the pivot pin itself which tends to rotate relative to both parts of the hinge as the hinge is operated. It will be appreciated that hinges for domestic appliances are mass produced items made at minimal cost and it is not, therefore, feasible to fabricate the pivot pin integrally with one of the hinge members, either economically or for speed of manufacture. The pivot pin normally employed is a form of semi-tubular pre-headed rivet which secures, but does not clamp, the hinge elements together, and which is free to rotate with either of the hinge elements.

The pivot pin is inserted through preformed and aligned holes in the hinge element and upset to prevent withdrawal.

It is also known to provide a square hole in a hinge element and a similarly sized square shoulder under the head of a rivet-like pivot pin to thereby secure the pin against axial movement relative to the hinge element, but this method is relatively unreliable due to a high failure rate in assembly and adversely affects the economics of the hinge assembly process. It is also known to provide a hexagonal hole and a similarly multifaceted rivet for maximum torque-out resistance in blind fastening applications. An entirely different approach has, however, been taken in the present invention, an object of which is to provide a cheap, relatively squeak-free hinge for use in major domestic appliances in that a hexagonal or other non-circular hole is provided in one hinge element, a circular hole is provided in the other hinge element and a specially and critically designed circular semi-tubular rivet is inserted in the two holes. A critical pressure is then applied to the rivet so as to deform part of the shank thereof to the hexagonal or other non-circular shaped hole in the one hinge element while retaining the circular shape of another part of the shank to permit rotation of the second hinge element relative to the rivet and the one hinge element. The end of the rivet adjacent the hexagonal hole is normally preheaded and the other end of the rivet is preferably deformed slightly to form a bulge or second head, so as to prevent the rivet or pivot pin falling out. It must be stressed that this procedure is not riveting in the sense generally understood by those skilled in the art in that the pressure exerted on the rivet, although sufficient to upset desired portions thereof is insufficient to effect clamping of the hinge elements.

An object of the present invention is to provide a method of securing a stud or rivet-like element in a base so as to prevent rotating thereof relative to the base without incurring additional cost, and a preferred object of the invention is to provide a method for hingedly connecting at least two elements by means of a pivot pin which is restrained from rotation relative to one or more elements.

Another object of this invention is to provide a novel semitubular rivet element.

By one aspect of this invention, there is provided a method of securing a pin element, having an axial tubular portion adjacent one end and a non-tubular portion, against rotation in a base member, said method comprising the steps of: (a) forming a non-circular axial hole in said base member adapted to slideably receive said pin element; (b) aligning said tubular portion in said non-circular hole; and (c) upsetting said tubular portion of said pin element so as to conform its shape to said non-circular hole; the axial length of said tubular portion corresponding substantially to the axial length of said non-circular hole in said base member.

By another aspect of this invention, there is provided a method for making a hinge comprising a first portion having a pair of parallel spaced apart lugs, a second portion having a pair of parallel spaced apart lugs adapted to lie between said lugs on said first portion, and a headed pivot pin which is provided with a tubular portion adjacent the head and is of a calculated length corresponding substantially to the thickness of a said first portion lug, said method comprising the steps of: (a) forming a hole in each lug of said first and second portions so as to provide a non-circular hole in at least one lug of said first portion and substantially circular holes in the remaining lugs; (b) aligning said holes and inserting therethrough said pin with said tubular portion adjacent said non-circular hole; and (c) applying sufficient force to the ends of said pin so as to deform the end remote from said head and to conform said tubular portion to said non-circular hole in said other lug, thereby preventing withdrawal and rotation of said pin relative to said first portion.

The invention will be described in more detail hereinafter with reference to the accompanying drawings in which:

FIG. 1 is a side view of a riveting machine used in the present invention;

FIG. 2 is an enlarged view of the rivet holder employed in the machine of FIG. 1;

FIG. 3 is a sectional view of a semi-tubular rivet of the present invention;

FIG. 4 is a section through a rivet-hinge assembly during the first stage of forming;

FIG. 5 is a section through a rivet-hinge assembly during the second stage of forming;

FIG. 6 is a section along VI—VI of FIG. 5 showing deformation of the rivet to conform to the shape of the hole in one hinge element;

FIG. 7 is a perspective view of a chest freezer hinge incorporating pivot pins according to the present invention; and FIG. 8 is a section through a stud employed according to the present invention.

In FIG. 1 there is shown a standard riveting machine 1, which can be employed in the method of the present invention and in which rivets 2, as shown in FIG. 3, are fed from a hopper 3 via a guide track 4 to a rivet holder 5, shown in more detail in FIG. 2. The component hinge elements to be assembled (not shown) are manually located on the fixed anvil 6, over the spring loaded pilot pin 7 which lines up and centres the holes therein. As the punch head 8 comes down, the rivet holder 5 releases the rivet 2 as pin 7 engages the hollow end 9 of the rivet and, as the pin is pushed down against the action of its spring, the rivet is guided through the holes in the elements to be assembled. As the rivet strikes the anvil 6, the circular groove 10 on the face of the anvil causes the tubular end 11 of the rivet to curl, thus creating a second head 12 which is shown in FIG. 4 and which prevents the rivet 2 falling out as the two components 13 and 14 are now retained between a first preformed head 15 and the second head 12 of the rivet 2.

Upon continuation of the down stroke of the punch head 8, the weakened wall portion 16 of the rivet 2 will bulge outwardly, as shown in FIG. 5, and assume the shape of the hole 17 in component 13, shown in cross-section in FIG. 6. Preferably the hole 17 is hexagonal in cross-section for maximum torque-out resistance, but it will be appreciated that other non-circular shapes such as square, octagons and the like are effective.

It will be appreciated that by selection of distance A to be somewhat greater than the combined thicknesses of components 13 and 14, and by adjusting the total down stroke of the head 8, the proper clearance for sliding movement between components 13 and 14 can be provided. Similarly, the depth and diameter of the hole 18, forming the weakened portion 16, is critical and is calculated from case to case based on data relating to shape of hole 17, material properties of component 13, thickness of component or components 14, a strength factor of the material from which the rivet is made, and actual diameter of hole in component or components 14. The depth should not exceed the thickness of the component 13 in order to confine bulging only to that part of the rivet 2 adjacent hole 17 in component 13. The depth of hole 9 which, with walls 11 forms the second head 12, is not critical and can in fact be quite shallow, as head 12 may be quite small as it is for retention purposes only and little or no force is applied thereto.

FIG. 7 shows two pivot pins 19, 20 in a conventionally designed freezer hinge 21 but which is fabricated according to the present invention and in which 22 is a body portion housing a spring 23 and 24 is a lid portion having pin 20 to which one end of spring 23 is attached. Body portion 22 and lid portion 24 are pivotally connected by pivot pin 19. By preventing pin 19 from rotating relative to body portion 22 and pin 20 from rotating relative to lid portion 24, two squeak producing areas of the construction are eliminated and fabrication costs are reduced.

Example

Hinge components as shown in FIG. 7 were assembled on a machine as shown in FIG. 1. Fasteners 19 and 20 were shaped as shown in FIG. 3. Fastener 19, fabricated in cadmium plated steel, was 0.843" long and had a diameter of 0.248", with a head 0.340" in diameter. Bore 9 was 0.184" diameter and 0.218" deep and bore 18 was 0.193" diameter and 0.158" deep. The fastener 19 was employed to secure a hinge lid portion 24 to a hinge body portion 22. Body portion 22 was provided with a pair of arms 25 and 26 adapted to receive the fastener 19. Arm 25 was provided with a hexagonal hole 17 as shown in FIG. 6, 0.254" across flats and arm 26 was provided with a circular hole as were arms 27 and 28 in head 24. The thickness of arms 25 and 26 was 0.050" and they were spaced 0.50" apart. The stroke of the punch head 8 was adjusted so as to exert sufficient force on the head 15 to form a second head 12 and deform wall 16 to conform to hexagonal hole 17, while still permitting axial movement of lid portion 24 relative to body portion 22. Fastener 20 was fabricated in a similar manner to connect the opposed faces 27 and 28 of lid portion 24 and provide an anchor point for a spring 23.

It will be appreciated that this invention has been described with particular reference to hinge elements pivotally connected by a non-rotatable pin element but many modifications without departing from the scope of the invention are possible. For example, the present concept is equally applicable to the anchoring of studs to any kind of base by the simple expedient of making bore 18 slightly deeper than the thickness of the base so that some bulging 29 occurs beyond the base and thus secures the stud against withdrawal, as shown in FIG. 8. The hole through base 13 is non-circular, and preferably hexagonal, in order to prevent rotation of the stud relative to the base.

I claim:

1. A method of reducing squeak in a hinge assembly of the type in which a pair of hinge members are pivotally interconnected by a headed rivet passing through axially aligned holes therein comprising:
   (a) providing a first hinge member having a noncircular hole therethrough and a second hinge member having a circular hole therethrough;
   (b) providing a rivet having (i) a head and a stem portion, said stem portion having a constant external diameter throughout its entire length, (ii) an axial bore through the head and extending into the stem to provide a longitudinal substantially circular tubular portion corresponding in length substantially to the thickness of said first hinge member, and a solid stem portion contiguous with said tubular portion and extending therefrom;
   (c) axially aligning said noncircular and said circular holes;
   (d) inserting said stem portion through said aligned noncircular and circular holes in said respective hinge members so that the head of said rivet abuts said first hinge member and said solid stem portion projects into said circular hole in said second hinge member; and
   (e) applying a compressive force to the ends of said rivet sufficient only to upset and radially expand said tubular portion to a shape substantially conforming to said noncircular hole, thereby preventing rotational movement of said rivet relative to said first hinge member while permitting movement of said second hinge member relative to said first hinge member and said rivet and thus produce a substantially squeak free hinge assembly.

2. A method as claimed in claim 1 including upsetting the solid stem end of said rivet to thereby prevent withdrawal of said rivet from said hinge assembly.

3. A method as claimed in claim 1 wherein said solid stem end of said rivet is prebored to thereby facilitate the upsetting thereof.

4. A method as claimed in claim 1 including providing a hexagonal hole in said first hinge member.

5. A method for securing a rivet in a plurality of planar members, comprising:
   (a) providing a first planar member having a non-circular hole therethrough and a second planar member having a circular hole therethrough;
   (b) providing a rivet having (i) a head and a stem portion, said stem portion having a constant external diameter throughout its entire length, (ii) an axial bore through the head and extending into the stem to provide a longitudinal substantially circular tubular portion corresponding in length substantially to the thickness of said first planar member, and a solid stem portion contiguous with said tubular portion and extending therefrom;

(c) axially aligning said non-circular and said circular holes;

(d) inserting said stem portion through said aligned non-circular and circular holes in said respective members so that the head of said rivet abuts said first member and said solid stem portion projects into said circular hole in said second member; and (e) applying a compressive force to the ends of said rivet sufficient only to upset and radially expand said tubular portion to a shape substantially conforming to said non-circular hole, thereby preventing rotational movement of said rivet relative to said first member.

6. A method as claimed in claim 5 including upsetting the solid stem end of said rivet to thereby prevent withdrawal of said rivet from said planar members.

* * * * *